W. J. GIBBS.
SHOE FITTING DEVICE.
APPLICATION FILED APR. 3, 1914.
1,286,586.
Patented Dec. 3, 1918.
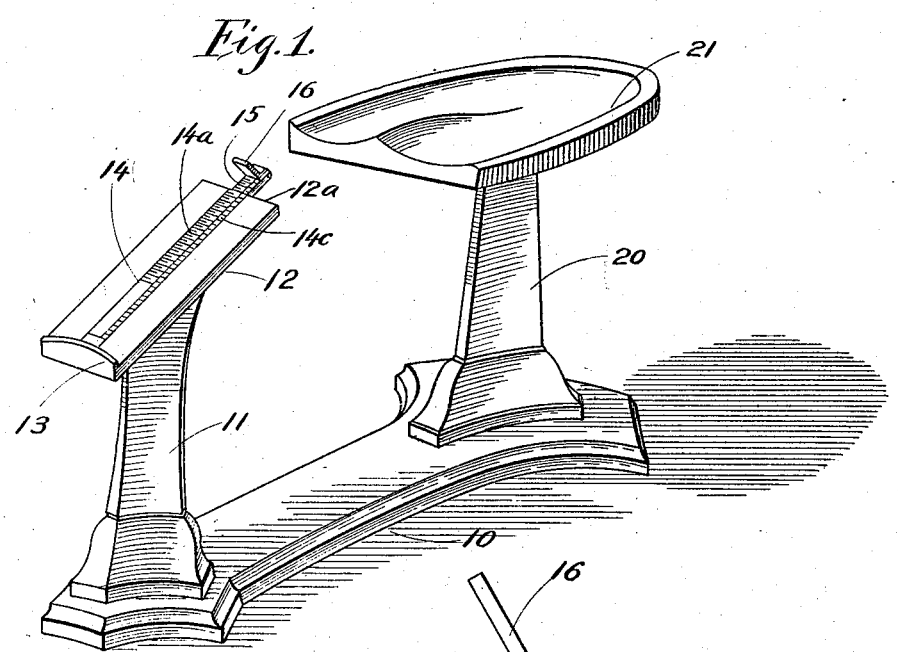
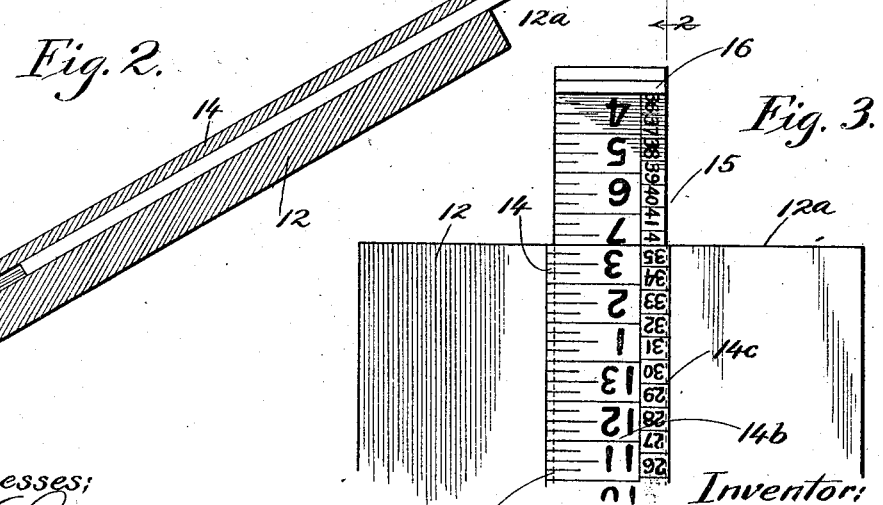
Witnesses;
C. E. Burnap
Henry A. Parks
Inventor:
William J. Gibbs
By Sheridan, Wilkinson and Scott Atty

UNITED STATES PATENT OFFICE.

WILLIAM J. GIBBS, OF CHICAGO, ILLINOIS, ASSIGNOR TO MARSHALL FIELD & COMPANY, OF CHICAGO, ILLINOIS, A CORPORATION OF ILLINOIS.

SHOE-FITTING DEVICE.

1,286,586.

Specification of Letters Patent.

Patented Dec. 3, 1918.

Application filed April 3, 1914. Serial No. 829,369.

*To all whom it may concern:*

Be it known that I, WILLIAM J. GIBBS, a citizen of the United States, residing at Chicago, in the county of Cook and State of Illinois, have invented certain new and useful Improvements in Shoe-Fitting Devices of which the following is a specification.

This invention relates to improvements in shoe fitting devices, and has for its object to provide an improved device comprising a foot support which is provided with means to measure the size of a customer's foot indicating the size of shoe needed for such foot.

An object of this invention is to provide a measuring means in connection with such a device which will enable direct reading by the salesman from his position, of the measuring elements.

Still another object is to provide such a device with a scale embedded in the surface of the foot support to indicate sizes up to a certain limit, and also to provide a slidable or expansible scale adapted for use as a continuation of the fixed scale for measuring larger sizes of feet.

Still another object is to provide such measuring scale so arranged that the said extension, when used, will enable reading of the size of shoe desired at the edge of the foot support.

All these and other objects will be set forth and made apparent in the following specification and accompanying drawing, in which;

Figure 1 is a perspective of a shoe fitting device embodying my invention;

Fig. 2 is a detail section through the foot support;

Fig. 3 is a detail of the sliding and fixed scale arrangement;

Like numerals refer to like elements throughout the drawings.

10 indicates a base member formed of wood or other suitable material at the forward portion of which extends upwardly a supporting pedestal 11, upon which is mounted a shoe support 12. This shoe support is inclined with respect to the base member 10 in order to enable the user to rest the foot thereon in a comfortable position. At its lower end the support 12 is provided with the upstanding flange 13. A scale 14 is embedded in the upper surface of the support 12 and extends from the flange 13 to the other end or edge $12^a$ of the support being substantially flush with the upper surface of such support. The scale is provided with suitable indications $14^a$; see Fig. 3, certain of which are designated by numerals such as $14^b$. In the arrangement shown, these numerals do not read directly the size of foot, but preferably indicate the size of shoe required to correspond to a foot of that length. Other lines and numerals, $14^c$, indicating sizes according to the French system may be located at one side thereof, when so desired. The shoe support 12 being of convenient length, is limited to certain sizes of foot, as will be apparent, the length of the scale 14 being correspondingly limited, and to provide for larger feet, I utilize a sliding scale 15 mounted in the foot support 12 beneath the scale 14, and in such manner as to slide in and out as desired. At the end of this scale I provide a hinged tongue or flap 16 which may be swung downwardly from operative position when so desired. This scale 15 is provided similarly with indicating marks and numerals, as shown in Fig. 3, the numerals on both scales being reversed, for a purpose to be hereinafter described. One advantageous feature of my invention is that I provide the sliding scale 15 with numerals representing increasing sizes in a direction reverse of the direction of increase of those on the fixed scale 14, the first numeral on the scale 15 representing the next size larger than that last shown on fixed scale 14. By this arrangement, as the sliding scale 15 is drawn out to accommodate the larger sizes of foot when the tongue 16 is in contact with the end of the foot, the edge $12^a$ of the foot support and the corresponding end of fixed scale 14, will directly indicate on scale 15 the size of shoe needed.

The slide 15 may readily be removed and replaced and this function renders the device practical for the following reason. The sizes of shoes as represented by the common numerals employed vary but little; therefore the indicating numerals must be of small size and not readily visible from the elevation from which they must be viewed. To avoid error in reading the size it is desirable that after measuring the customer's foot the slide be withdrawn and examined at closer range or in a better light, the correct point being retained by the finger. This is accurately performed by placing the thumb nail against the upper edge 12ª and in contact with the slide 15. The other fingers then engage beneath the slide and withdraw it whereupon the measurement can be accurately read.

I provide a second pedestal 20 extending upwardly from the base 10 and spaced from pedestal 11. On this pedestal I provide a salesman's seat 21, so located that he may readily use the measuring scales, and by virtue of the inverted numerals thereon, he is enabled to directly read the size of shoe required.

It will be obvious that my invention is capable of many modifications and changes, and I do not wish to be restricted to the form shown and described beyond the scope of the appended claims.

What I claim is:—

1. In a shoe fitting device, in combination a foot support, said support being provided with a scale for measuring feet for short shoes, a scale slidably mounted in said support and arranged to form an extension of said first scale for measuring feet for larger shoes, the readings on the second scale being arranged to indicate at the end of the first scale the size of the shoe needed.

2. In a shoe fitting device, in combination a foot support, said support being provided with a scale for measuring feet for short shoes, a second scale slidably mounted in and removable from said support and arranged to form an extension of said first scale for measuring feet for larger shoes, the readings on the second scale being arranged to indicate at the end of the first scale the size of the shoe needed.

In testimony whereof, I have subscribed my name.

WILLIAM J. GIBBS.

Witnesses:
 Geo. L. Wilkinson,
 Henry A. Parks.

Copies of this patent may be obtained for five cents each, by addressing the "Commissioner of Patents, Washington, D. C."